Patented Aug. 5, 1930

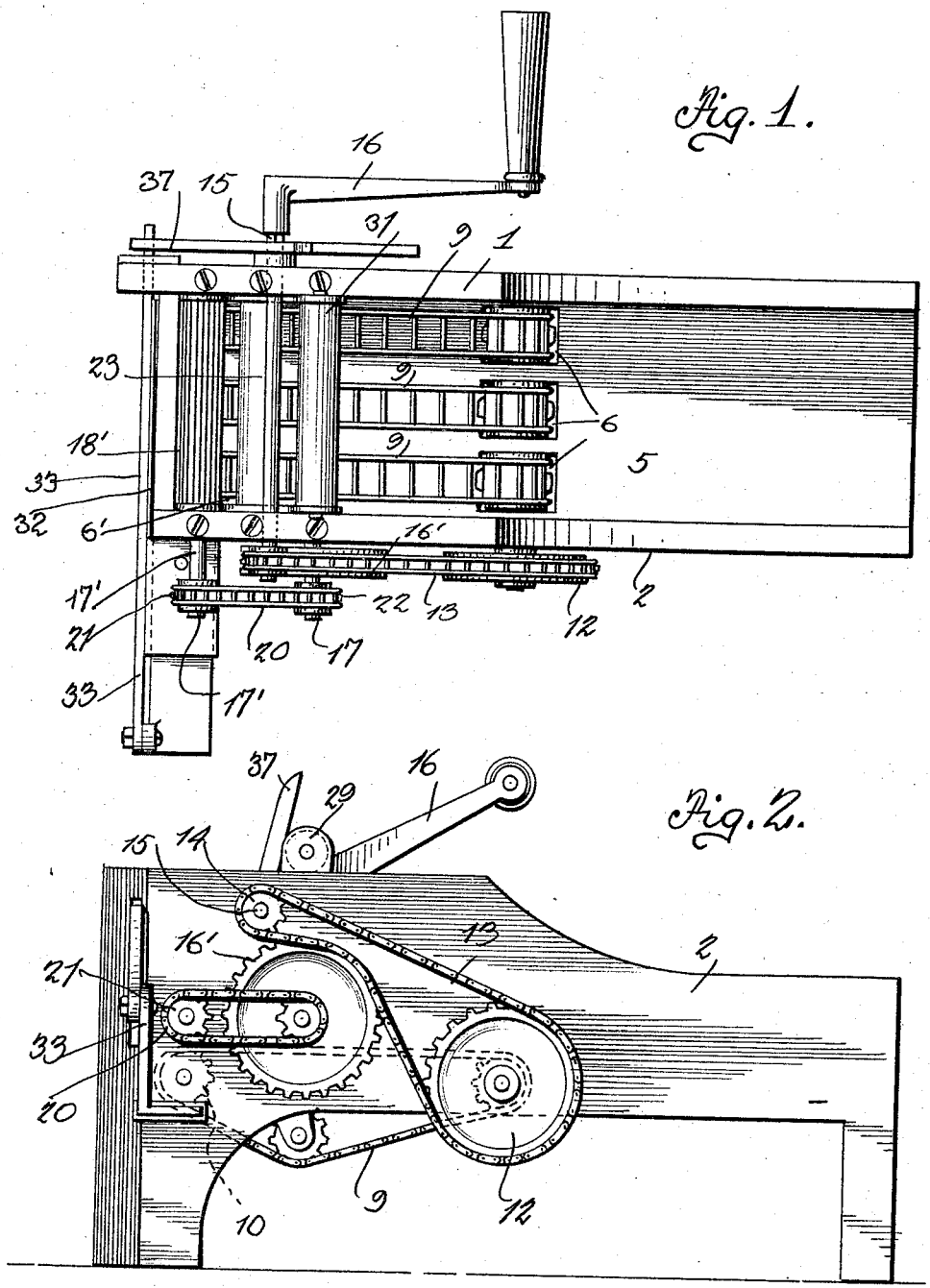

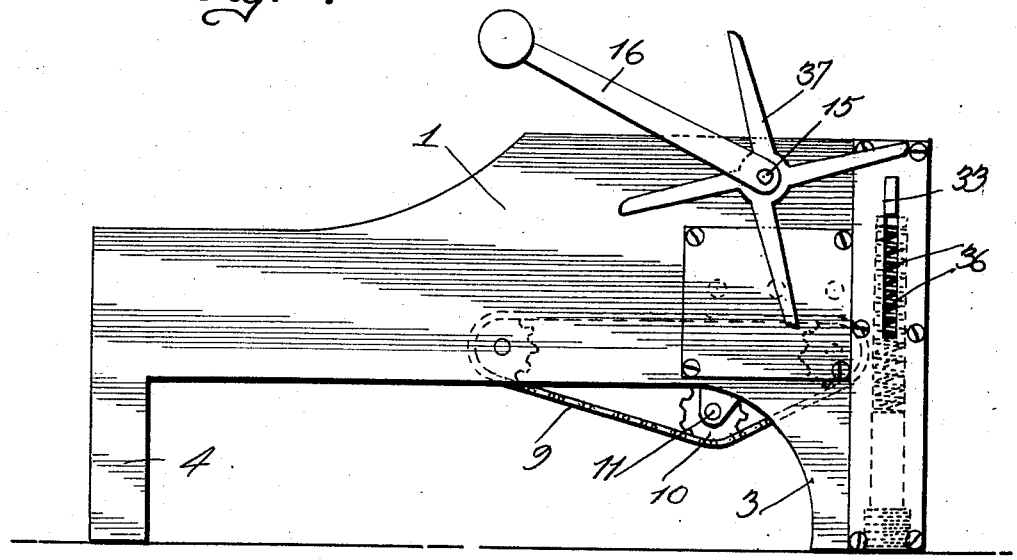
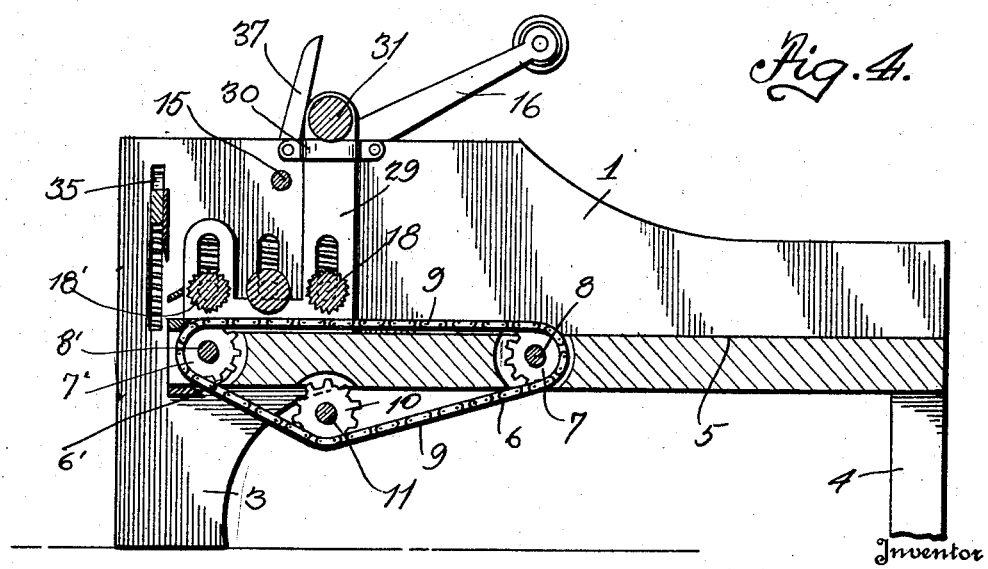

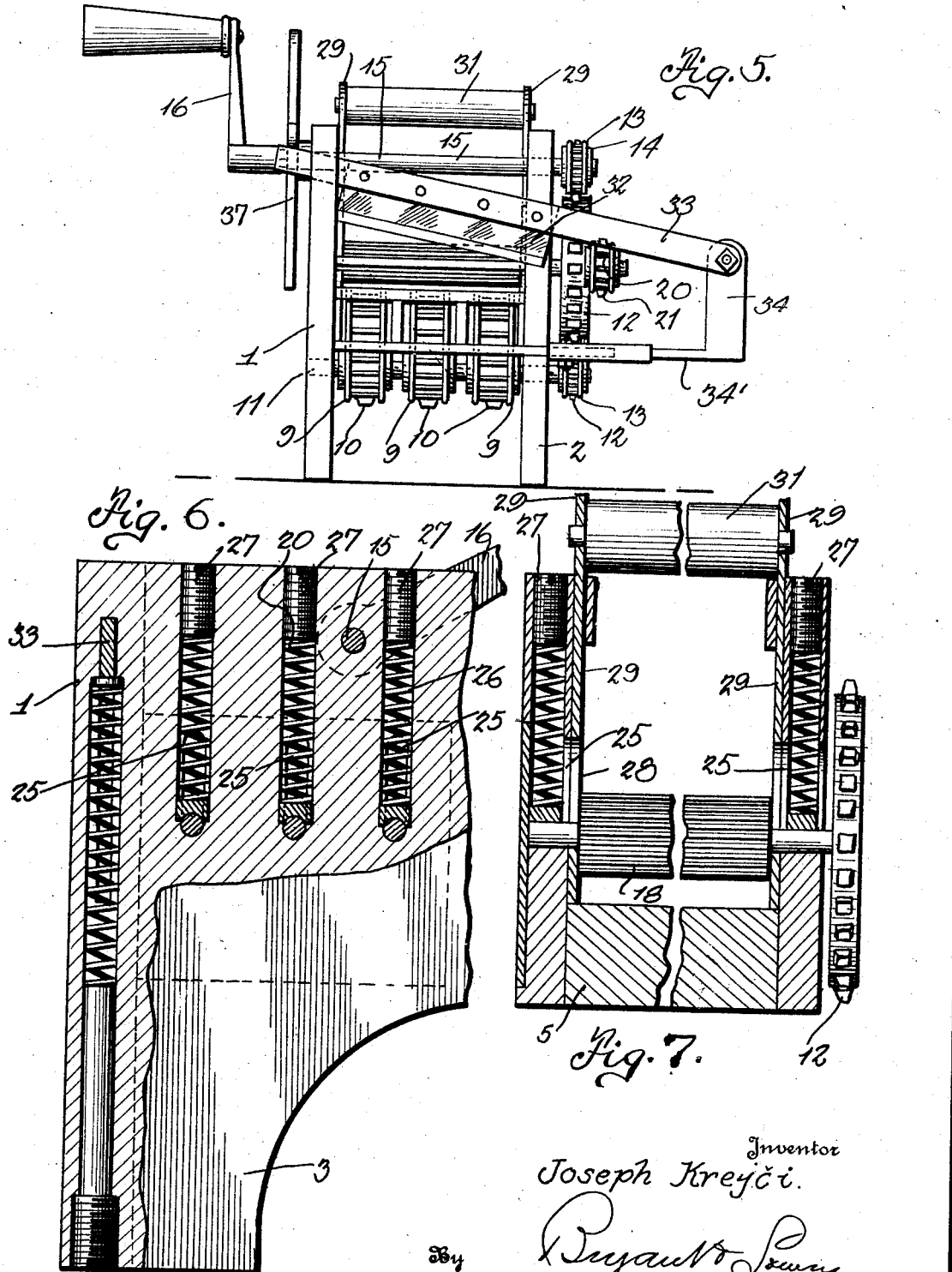

1,772,397

UNITED STATES PATENT OFFICE

JOSEPH KREJČI, OF TYNDALL, SOUTH DAKOTA

MACHINE FOR CUTTING NOODLES

Application filed October 25, 1929. Serial No. 402,486.

This invention has relation to machines for cutting noodles and consists in the novel construction, combination and arrangement of elements constituting a machine having an elongated trough for feeding the material to be cut through said trough, a knife operating to cut the material in slices, mechanism operable from a main shaft to depress the knife at regular periodic intervals, means for automatically raising the knife after each cut, and means for regulating the pressure of the feeding rolls and effecting other operations and results hereinafter more particularly set forth.

In the accompanying drawings illustrating a suitable and preferred embodiment of the invention, Figure 1 is a top plan view of the machine;

Figure 2 is a right side elevation of the same;

Figure 3 is a left side elevation;

Figure 4 is a vertical longitudinal sectional view;

Figure 5 is a front elevation;

Figure 6 is a detached sectional view through the front part of one of the side walls of the feeding trough; and Figure 7 is a transverse sectional view of the forward end of the machine.

The machine to be described comprises an elongated trough having the vertical side walls 1, 2 mounted on suitable supports 3, 4 and having a floor 5. The trough is open at the top and at the ends. Openings 6, 6' are formed in the floor for the reception of sprocket wheels 7, 7', which are mounted on transverse shafts 8, 8'. A series of carrier chains 9, 9 are trained around these sprocket wheels, and pass below and in engagement with a series of sprocket wheels 10, 10 mounted on a transverse shaft 11, below the floor of the trough.

On one end of the shaft carrying the sprocket wheels 7 and on the outside of the trough a larger sprocket wheel 12 is mounted, around and in engagement with which passes a chain 13, which then passes around a smaller sprocket wheel 14, keyed on the end of the transverse drive shaft 15 which extends across the upper and forepart of the trough and has its bearings in the side walls of the latter.

A crank lever 16 is attached to one end of the shaft 15 and through this, motion is given to the carrier chains, in the proper direction to move their upper sections forward in the direction of the knife.

The chain 13 engages with another larger sprocket wheel 16', and drives the same. This wheel is mounted on a transverse shaft 17, upon which is carried a horizontally ribbed roller 18, located within the trough. A similar roller 18' arranged in advance of the roller 18 is operated from the shaft 17 by means of a chain 20 engaging sprocket wheels 21, 22 keyed respectively to the shaft 17 of roller 18 and shaft 17' of roller 18'. The rollers 18 and 18' are positively driven in the same direction and are spaced apart a sufficient distance for the positioning of a smooth surfaced idle roller 23.

The shafts of the several rollers have vertical play in slots 25, in the walls of the troughs and are under vertical pressure from the spiral springs 26, which are seated in sockets in the trough walls and under the tension of adjusting screws 27.

The end portions of the shafts 17, 17' project through vertical slots 28, formed in the upright portions of the L-shaped plate 29, and the longer legs of these plates extend upwardly through guide brackets 30 attached to the walls of the trough. These longer legs or members are connected at their upper ends by a handle roller 31 by which the plates may be lifted to lift the rollers when necessary during the operation of the machine.

The numeral 32 designates the cutting blade which is arranged in a vertical plane at the forward end of the trough and is attached to a bar 33 pivoted at its rear end to a standard 34 supported by a horizontal bar 34'. The forward end of the bar 33 projects through a vertical slot 35 in the wall of the trough. A spiral spring 36 seated in a vertical socket in the wall of the trough bears against the lower edge of the bar 33, and tends to force the latter and the blade upwardly and beyond the lower level of the rollers.

The knife is actuated to make a downward cut by means of the spider 37, which is secured to the main shaft 15 and consists of a hub and a series of radial arms which are rounded on one side of the ends so as to easily pass over the knife.

When the shaft 15 is rotated in the proper direction, the arms of the spider 37 successively depress the knife and after each depression or cut, moves past it, allowing the knife to spring upwardly for another cut.

As will be understood, the dough or other material is placed in the trough and upon the rear portions of the carrier chains and is conveyed to the series of rollers under which it passes to the knife which cuts the material in strips of uniform width.

The bar 34 is attached to a flat tubular collar 34' which slips over the end of a bar 34² projecting from the wall 2 of the trough, and is removable therefrom to take out the knife.

The spider 37 may be of a different size and embody any number of arms so that noodles of different widths may be cut, while the frame structure may be anchored in any convenient manner to a table or other support.

I claim:—

A cutting machine of the character described, comprising an elongated trough, an endless chain carrier located therein, sprocket wheels engaging said carrier, a driving shaft, a train of sprocket wheels and chains connected to said driving shaft and arranged and adapted to convey motion to the carrier, a series of feed rollers arranged to rotate above said carrier and to receive positive motion through chain and sprocket connection from the driving shaft, a vertically movable cutting implement and means for operating the same intermittently from the said driving shaft, said feed rollers being mounted on vertically moving plates and provided with means for raising the same.

In testimony whereof I affix my signature.

JOSEPH KREJČI.